United States Patent

Von Arx et al.

[11] Patent Number: 6,147,335
[45] Date of Patent: Nov. 14, 2000

[54] ELECTRICAL COMPONENTS MOLDED WITHIN A POLYMER COMPOSITE

[75] Inventors: Theodore T. Von Arx, LaCrescent, Minn.; Louis P. Steinhauser, St. Louis; A. Konrad Juethner, Crestwood, both of Mo.

[73] Assignee: Watlow Electric Manufacturing Co., St. Louis, Mo.

[21] Appl. No.: 09/276,454

[22] Filed: Mar. 25, 1999

Related U.S. Application Data

[63] Continuation-in-part of application No. 08/944,592, Oct. 6, 1997.

[51] Int. Cl.[7] .................................................. H05B 3/44
[52] U.S. Cl. ...................... 219/544; 392/503; 338/262; 338/269; 338/275
[58] Field of Search .................................. 219/523, 534, 219/542, 543, 544, 546, 553, 437; 392/497, 502, 503; 338/254, 255, 262, 263, 264, 265, 269, 275; 374/132, 141, 163, 170, 171

[56] References Cited

U.S. PATENT DOCUMENTS

| | | | |
|---|---|---|---|
| 3,890,485 | 6/1975 | Kozbelt | 219/523 |
| 4,156,128 | 5/1979 | Craven | 219/523 |
| 4,965,436 | 10/1990 | Churchill | 219/544 |
| 5,155,800 | 10/1992 | Rezabek et al. | 219/544 |
| 5,221,916 | 6/1993 | McQueen | 219/544 |
| 5,237,155 | 8/1993 | Hill | 219/544 |
| 5,714,738 | 2/1998 | Hauschulz et al. | 219/544 |
| 5,862,303 | 1/1999 | Adar et al. | 219/553 |

*Primary Examiner*—Teresa Walberg
*Assistant Examiner*—Fadi H. Dahbour
*Attorney, Agent, or Firm*—Herzog, Crebs & McGhee, LLP

[57] ABSTRACT

Various components of thermal systems are shown molded within a polymer composite sheath, including heaters, sensors, and control circuits. The use of transfer and compression molding allows for the use of thermoset polymers containing very high levels of reinforcement fillers. These improved materials, in turn, create a component with superior thermophysical properties, including high heat flux levels, thermal conductivity, impact resistance, corrosion resistance, and maintenance of mechanical properties at high temperatures (>300° F.). The present invention also allows for wide variety of geometric configurations and the possibility to insert temperature sensors directly in hot zones of heaters.

17 Claims, 5 Drawing Sheets

ELECTRICAL COMPONENTS MOLDED WITHIN A POLYMER COMPOSITE

This a continuation-in-part of U.S. patent application Ser. No. 08/944,592 filed Oct. 6, 1997 entitled MOLDED POLYMER COMPOSITE HEATER.

FIELD OF THE INVENTION

The present invention relates to electrical components, and more particularly to electrical components, generally for thermal systems, molded within a polymer composite.

BACKGROUND OF THE INVENTION

Electric resistance heaters are common place in industry, and generally comprise a resistance wire, through which an electric current is passed, a ceramic core, around which the same wire is disposed, a dielectric ceramic layer, which surrounds the current-carrying core, and a metal alloy sheath to complete the assembly. One form of electric resistance heater, known as a cartridge heater, which is used in a very wide range of applications, has a cylindrical sheath, which has historically been made of corrosion-resistant metal alloys such as stainless steel or incoloy. To enhance thermal performance of the heating element, the above assembly is typically swaged.

Figure 1:
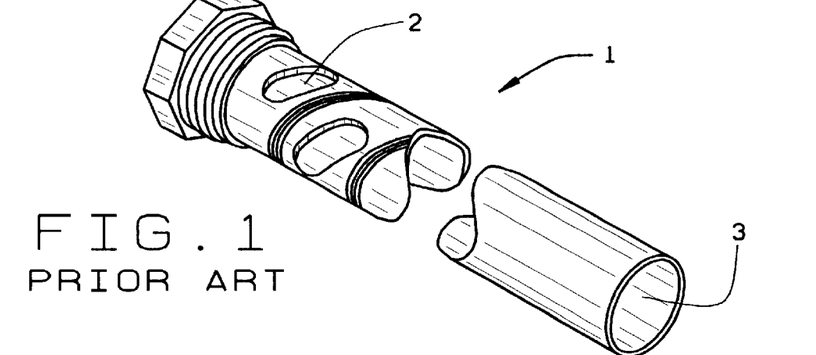
FIG. 1 is an isometric view of a prior art polymer heater as disclosed in U.S. Pat. No. 5,586,214 to Eckman.

More recently, industry has been looking for alternative cartridge heaters that weigh less, cost less to produce, that can be designed with greater geometric flexibility, and that can be cost-effectively mass produced while yielding excellent thermal and mechanical performance. One solution was proposed in U.S. Pat. No. 5,586,214 to Eckman and jointly assigned to Energy Converters, Inc. of Dallas, Pa. and Rheem Mfg. Co. of New York, N.Y. Eckman discloses an immersion heater, somewhat similar to a cartridge heater in shape, but being hollow and having apertures in the sheath. Instead of being a solid cylinder, the core represents an injection molded polymeric hollow tube onto which a sheath is injection molded. Therefore, the heater does not have a "core" in the traditional sense. The Eckman heater is shown in FIG. 1.

The Eckman heater does have certain advantages over the prior art, such as low weight, low manufacturing cost at high volume, and its high resistance to galvanic corrosion and mineral depositing. Yet the Eckman heater has many limitations which leaves it undesirable for most applications other than low temperature and low heat flux water heating tanks.

This is supported by the limitation of thermoplastic matrices to accept filler medium. In this context, Eckman discloses that the filler level in these polymeric matrices cannot exceed 40% by weight, which correlates with the research results obtained during the development of the present invention.

Providing a solid core (or at least one of substantially greater wall thickness) in the Eckman heater is not as easy as changing the geometry of the polymer, around which the resistance wire is wound. If a core polymer with the same temperature dependent thermal expansion function as the outer polymer is used, the heater will be prone to cracking and failure when energized and brought to operating temperature. Eckman teaches that the outer polymer coating needs to be less than 0.5 inches and ideally less than 0.1 inches, which further sacrifices structural strength. Eckman achieves somewhat higher thermal conductivity and higher possible heat fluxes than would be found in a pure polymer by suggesting the use of carbon, graphite, and metal powder or flakes as an additive. The amount of these additives must be limited though to protect the heater's dielectric strength. Even then, thermal conductivity does not get significantly better than 1.0 W/(m*K).

It is also preferable to have other components of thermal systems, such as sensors, control systems, and thermoelectric modules that can be used for either cooling or heating purposes, placed in a low weight, low cost housing. Most of these components however are not suitable or only marginally suitable for molding within an injection molded polymer. This is due, in part, to the high temperatures to which the parts are exposed during molding, and also in part due to the marginal rewetting capabilities of many injection molded plastics. Even with components that are not as vulnerable to the high temperatures of injection molding, such as some temperature sensors, the low thermal conductivity of these polymers, as mentioned above, limit the usefulness of the finished product.

It is thus an object of the present invention to provide a molded polymer composite heater with a composite filler level of substantially greater than 40%.

It is also an object of the present invention to provide a molded polymer composite heater with improved structural integrity.

It is further an object of the present invention to provide a molded polymer composite heater with greater core thickness up to the extreme where the hollow space in the center of the element vanishes.

It is yet another object of the present invention to provide a molded polymer composite heater with improved thermal performance, namely thermal conductivity and maximum heat flux.

It is still a further object of the present invention to provide a variety of electrical components for thermal systems encased in polymer sheaths.

Other objects of the invention will become apparent from the specification described herein below.

SUMMARY OF THE INVENTION

In accordance with the objects listed above, the present invention is a molded polymer composite heater having highly filled polymers, such that the polymers are best suited for either transfer molding or compression molding. Compared to the prior art, which specifically refers to injection molding, the present invention allows for much higher levels of fill. The higher levels of fill, which exceed 50% by weight and may reach as high as 90% by weight, provide polymer compounds with better mechanical properties such as strength and impact resistance, superior thermal properties, such as higher service temperatures, specific heat, and thermal conductivity, as well as improved electrical properties, such as dielectric strength and insulation resistance. The polymer composite core of the heater may have lead terminals inserted therein that contact an electrical resistance wire disposed therearound. It is also possible to mold the heater core and sheath at one time, in which instance there may not be a distinction possible between those two components.

The present invention also preferably uses a greater core and sheath thickness up to and including a solid core, which allows for a greater number of geometric variations and the possibility of including additional features in the heater. For instance, sensors may be included at a particular point in the heater, where temperature measurement is most critical, or microchips may be embedded within the heater providing controlling means integrated with the heater.

Thermoset polymers are preferably used, although a few select thermoplastics may be used as well. The polymers are filled with reinforcing additives, which increase viscosity of the raw and processable molding compound. For best results, the reinforcement level should exceed 50%. The structural integrity of thermoplastics diminishes quickly once reinforcement levels exceed 40%, thus the preference toward thermoset polymers which can exceed the 50% reinforcement level.

Different fillers may be used depending upon the particular need of an application. Some applications, will not need as much thermal conductivity, but will require high mechanical strength and impact resistance. Others may require high chemical resistance, low moisture absorption, etc.

The reinforcement filler may be made from a great number of materials, however many applications require good thermal conductivity of the polymer sheath. For such applications, it has been found that ceramic particulate or ceramic whisker fillers, such as magnesium oxide or boron nitride work well, in addition to many forms of carbon. One must be cautious in using carbon reinforcement, because it decreases the dielectric strength of the sheath and core. The present invention incorporates techniques that allow high fill levels (at least 60%) of carbon fibers without significant loss of dielectric strength, but provide good thermal conductivity and excellent mechanical strength.

According to one aspect of the present invention, the solid core is made of a polymer composite, as described above, formed into two interlocking halves. The halves may be made from the same mold, and have a self-mating feature, thus reducing the cost of manufacture.

The complete core will have bores for two or more pins. For power lead pins, the core will have sections that expose the bores, so that a resistance wire may be welded to the pins. Preferably, one exposed point of the power lead pins will be toward an end of the heater distal to where the lead pins emerge from the heater itself. Another exposed point should be proximate to the end where the lead pins emerge from the heater. This allows for a single wound resistance wire, which is desirable over looped (double wound) resistance wires that are more prone to high-potential short circuits.

Over the core, a polymer sheath is added. The sheath is primarily made of the same polymer composite as the core, although the exact composition may vary, particularly when differing coefficients of thermal expansion are desired, for high temperature applications (~>300° F.). Most of the sheath is added by transfer or compression molding. However, for applications requiring a high dielectric strength, an additional thin layer of polymer may be added by dipping, spraying, or screen printing, either the assembled core or the sheathed heater.

In producing the entire heater in a single mold, the heating element is inserted into a sandwich of sheet molding compound (SMC) or preformed bulk molding compound (BMC). The resulting sandwich is then placed in the compression mold for curing. This embodiment may not have a definable core.

The same technology can be applied to an unlimited number of electrical components, and is especially useful for components related to thermal systems. The resistance heating element can be replaced with two wires of different types wire in a any combination well-known in the art for making thermocouples or thermoelectric chillers.

In another embodiment, printed circuit boards with or without integrated circuits may be placed in a premolded polymer composite cradle. Thereafter, the circuit board and the cradle in which it rests are then encapsulated in a polymer shell applied preferably by over-molding. For example, integrated control systems may be placed in the polymer sheath together with a heater and internal temperature sensor.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein.

DETAILED DESCRIPTION OF THE DRAWINGS

The present invention is an electrical heater made of a polymer composite, which is preferably either transfer molded or compression molded. Prior attempts at producing polymer heaters have always used injection molding, thereby limiting the possible fill levels in the polymer, which in turn has severely hampered commercial uses of polymer heaters in all but the simplest of applications. The present invention may be used in many different applications, in part due to increases in heat flux and mechanical strength.

The use of higher fill levels also allows a wider range in the physical properties of polymer composites, which in turn allows more flexibility in the geometric configuration of the heater. In addition to making stronger, more durable, and higher thermally performing polymer heaters, this allows for the addition of extra features incorporated within the heater itself.

Referring now to FIG. 1, a prior art polymer heater 1 is shown as taught by U.S. Pat. No. 5,586,214 to Eckman. The Eckman heater has a plurality of holes 2 in the sheath of the heater, and a hollow bore 3 in lieu of a core. In contrast, thereto, the preferred embodiment of the present invention is shown as a cylindrical polymer composite heater 10 in FIG. 7. The preferred embodiment includes a sheath 12 incorporating molded threading 14 and a hexagonal flange 16 (both used for mounting). Emerging from the end 18 of the heater 10 proximate to the mounting features 14,16 are a plurality of power pins 20. The sheath 12 and the mounting features 14,16 are made of a polymer and formed either by transfer molding or compression molding.

Figure 2:
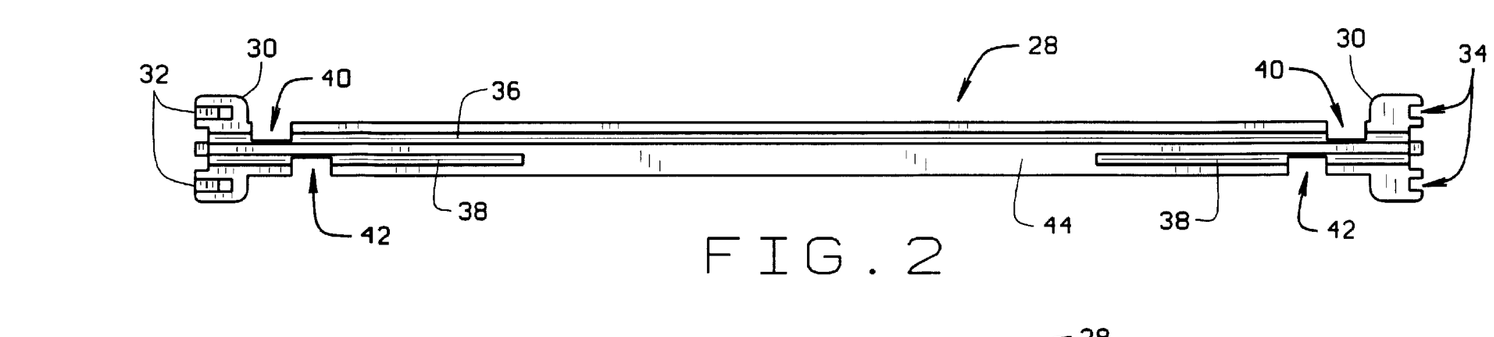
FIG. 2 is a bottom view of a molded polymer composite core semi-cylinder for use in the present heater.
Figure 3:
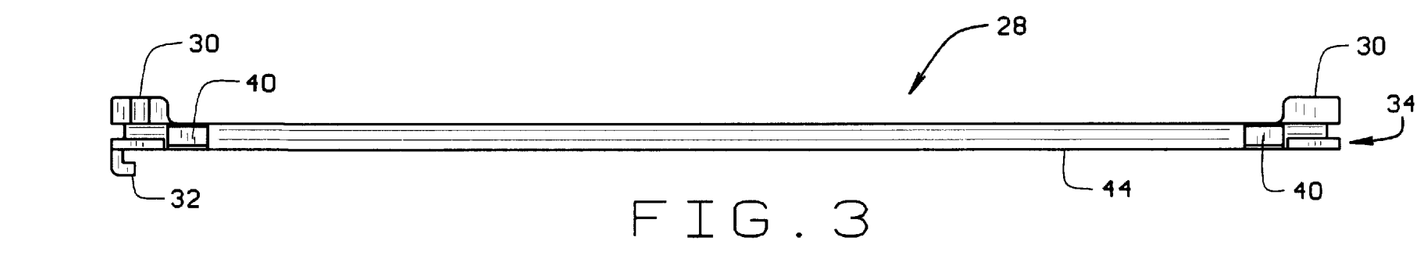
FIG. 3 is a front view of the core semi-cylinder in FIG. 2.
Figure 4:
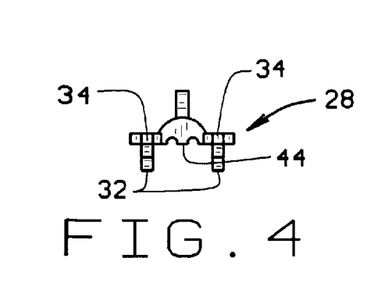
FIG. 4 is a right side view of the core semi-cylinder in FIG. 2.
Figure 5:
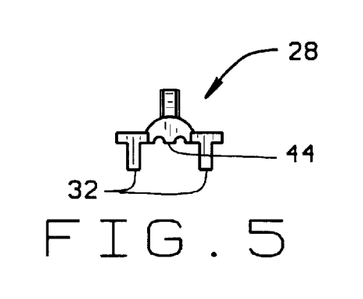
FIG. 5 is a left side view of the core semi-cylinder in FIG. 2.
Figures 6, 7:
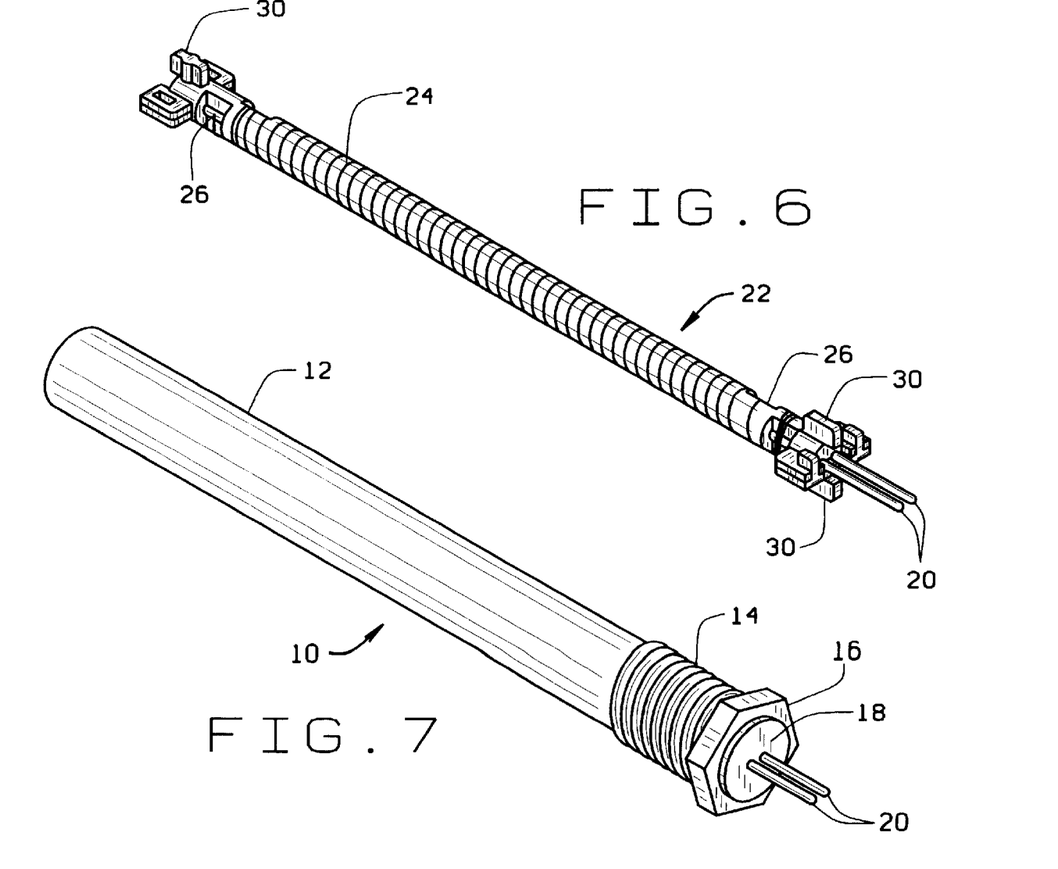
FIG. 6 is an isometric view of a molded polymer composite cylindrical core with a resistance wire disposed therearound and power pins inserted therein.
FIG. 7 is an isometric view of a cartridge heater embodiment of the present molded polymer composite heater.

Hidden beneath the sheath 12 is a completed core 22, shown in FIG. 6. The completed core comprises the power pins 20, a resistance wire 24 welded to the power pins 20 at weld points 26, and optionally formed of two core sections 28 (see also FIGS. 2 and 3). The preferred core sections 28 are identical and substantially cylindrical and semi-circular in cross section except for an end portion 30 on either side.

FIGS. 2–5 show a preferred core section 28. Each preferred core section 28 has one long longitudinal groove 36 that extends the entire length thereof and two short longitudinal grooves 38 running parallel to the long groove 36 that extend an equal distance from either end portion 30, one short groove 38 extending from each end portion 30. The grooves are located on the flat face 44 of the core section 28 (which is semi-circular in cross section). Thus, when the two identical core sections 28 are placed together, abutting at their flat faces 44, the grooves 36, 38 from one core section 28 match up to the grooves 36, 38 from the other core section forming a plurality of bores parallel with the axis of the cylinder.

The core 22 may incorporate a self-mating feature, wherein one end portion 30 of the core section 28 has one or more hooks 32 integrally molded thereon, and the other end portion 30 has an equal number of notches 34 therein. The notches 34 are adapted to receive the hooks 32 located on the other core section 28. This allows the core sections 28 to be cost-effecitvely mass produced with a single mold. It is also possible to form the core by directly insert molding the pins into a one-piece core. This entails literally molding the core around the pins and would allow a less complicated and delicate winding operation more suitable for automation.

As the core sections 28 are coupled together by their respective hooks 32 and notches 34, pins 20 are inserted into the bores formed by grooves 36 and 38. A resistance wire 24, made of any material known in the art, is then wound around the coupled core sections 28 beginning at a welding notch 42 proximal to the extending pin wires, (which gives access to the pin 20 in groove 38) and ending at another welding notch 40 distal to the extending pin wires (which gives access to the pin 20 in groove 36). The resistance wire 24 thus covers a substantial portion of the core 22. It is preferable to wind the resistance wire 24 around the core 22 only as a single strand. Due to the geometric limitations of injection molded polymer heaters, the resistance wire of the prior art had to be wound around the core as a double strand, looping around a hook near the end of the heater distal to the power pins. This prior art configuration increases the probability of high voltage short circuits, which can potentially lead to shorter life spans of the heater or even immediate failure and product rejection. The present single strand does not suffer from the same limitations. The present invention also allows for the resistance wire to be substituted for altogether by a resistive ink, which would be printed on the outside of the core. A typical ink for this use is a cermet polymer resistor series sold by Electro-Science Laboratories, Inc. of King of Prussia, Pa.

Transfer molding and compression molding are known in the art of plastics, and the techniques are disclosed in *Molded Thermosets,* by Ralph E. Wright, which is hereby incorporated by reference. In injection molding, which was used in the prior art, a compacting screw-and-barrel assembly receives the raw granular material from a hopper and melts the same by a heater band assisted screw-and-barrel shearing action. The intermittent reciprocating and rotating motion of the screw pushes the shot through a nozzle and into the mold itself.

In transfer molding, on the other hand, a non-compacting screw pre-plasticates the raw thermoset compound by the use of heater bands. Here, the screw action merely serves the purpose of transporting the material from the hopper to the unreduced barrel exit where the shot is cut and automatically transferred into a cylindrical cavity. A plunger follows thereafter applying great force (~40 tons) to the doughy shot causing tremendous pressure and temperature increase. In turn, the viscosity drops dramatically and the reaction temperature threshold is overshot while the material is pushed through the nozzle into the mold cavity. Another advantage of transfer (and compression) molding is a more effective perculation, which entails thermal bridging of high thermal conductivity particulates by fibers. Yet another advantage of transfer (and compression) molding is that embedded fibers added to the raw polymer maintain their lengths better during these molding processes as compared to injection molding. This is largely due to the fact that injection molding is a more traumatic process than others, causing the fibers to break by imposing intense shearing action thereupon. Additionally, the longer the fibers in the matrices, the more effective the percolation therein. Liquid composite molding ("resin transfer molding"), which is a variation of transfer molding, may also be used in the present invention. In the latter "fiber-friendly" process, the mold cavity is pre-loaded with filler material and the pure polymeric matrix is transferred into the cavity thereafter.

Formable polymers are generally classified as either thermoplastics or thermosets (also known as chemically setting polymers). Thermoplastic materials can be melted and, upon temperature decrease, brought back to solid state. In the solidification process, the polymeric chains contract by folding into one another creating physical bonds as a serving of hot and freshly cooked spaghetti would if one let it sit out to dry. Theoretically, it is possible to impose infinitely many melting/solidification cycles onto the material. In general, thermoplastics are highly impact resistant due to the loose arrangement of polymer chains, yet, allow a higher degree of moisture absorption for the same reason. Revisiting the spaghetti idea, the reader should not find difficult to envision dramatic decay of mechanical properties of thermoplastics at high temperatures.

On the other hand, thermosets can only solidify once whereas subsequent melting is not possible. This curiosity can be explained by the creation of chemical crosslinks between the polymer chains in the chemical reaction solidification process. Not surprisingly, the raw thermoset production material consists of appropriately sized chemical reaction ingredients whose reaction temperature threshold is intentionally exceeded in the molding process. These crosslinks restrict movement of the polymer chains with respect to one another, which translates into a more brittle character compared to thermoplastics. Furthermore, at higher temperatures the same chemical crosslinks maintain mechanical properties. Another advantage of thermosets is that they typically rewet better than thermoplastcis. That is to say, before the thermosets have completely cured, more thermoset polymer may be molded thereover, and the bond between the two layers will be strong and less permeable as chemical crosslinks will form across the layer boundary.

As disclosed by Wright, most thermoset plastics are not suitable for injection molding due to high viscosity. Injection molding also limits the amount of reinforcement that can be contained within the polymer composite to no greater than approximately 40% by weight. Fill levels much beyond 40% by weight yield plastics that are too viscous to injection mold when using thermosets (thermoplastics begin to lose structural integrity with fill levels much beyond 40% by weight). Furthermore, the converse is also true that with many plastics, fill levels much below 40% by weight yield a composite that is not viscous enough to transfer mold. The inventors of the present invention have discovered it is not until fill levels within thermoset polymer composites exceed 50% by weight that thermophysical properties are drastically improved. They have also discovered that thermosets in general provide better thermophysical properties for heaters than thermoplastics, particularly once fill levels exceed 50% by weight due to significantly better impact resistance and maintenance of mechanical properties at higher temperatures. Thermoset plastics with high fill levels, as a general rule, are not well suited for injection molding, hence the present invention uses transfer or compression molding.

Thermosets can also accept higher fill levels overall than thermoplastics. As already mentioned, thermoplastic polymers lose structural integrity if filled beyond 40% by weight. Thermosets, on the other hand, can accept fill levels as high as 90% by weight.

The present invention also yields a better heater by using high performance reinforcements. Specific reinforcing fillers provide better thermal conductivity than the fillers used in prior art polymer heaters. Eckman teaches the use of a few thermally conductive materials, such as graphite or metal powder, but specifically warns against excessive use of such fillers, because of loss in dielectric strength of the heater. This limitation may be overcome by the use of an intermediate dielectric layer (not shown) between the resistance wire 24 and the outer sheath 12. The dielectric layer is made of a polymer similar to the rest of the heater, however lacking a reinforcing filler. Dielectric inks from Electro-Science Laboratories, Inc. are well-suited for this purpose. This moots any concern over the dielectric strength of the outer sheath 12. To maximize the efficiency and thermal conductivity of the heater, the intermediate dielectric layer should by ultra thin, approximately 100 microns in thickness, however thicknesses up to 1 millimeter may also be suitable for the present invention. This may be applied to the core by implementing a dipping, spraying, or screen printing operation before over molding the outer sheath 12.

Another method of increasing thermal conductivity is by using carbon fibers as a reinforcing filler. Carbon fibers significantly improve the thermophysical properties of the heater, but they conduct thermal energy much better in their longitudinal, rather than their transverse direction. However, because the fibers behave like logs during the molding, aligning themselves in the direction of the mold flow, their natural tendency is to end up parallel to the heater surface (perpendicular to the heat flux). The desired orientation may be obtained by applying an electric field to the mold flow during manufacturing. The power pins 20 may act as one electrode, and the mold itself may act as the other.

Other desirable fillers that have been found are magnesium oxide (MgO), aluminum nitride (AlN), and boron nitride (BN). The inventors have found by means of the laser flash method (ASTM E1461), in the specific application of which all measured quantities are directly traceable to National Bureau of Standards ("NBS") standards, that such fillers provide thermal conductivity well in excess of 2.0 W/(m*K), and even up to 25.0 W/(m*K). On the other hand, it is highly unlikely that the prior art polymer heaters, such as disclosed in the Eckman patent, could ever significantly exceed 1.0 W/(m*K) using the same standard.

Desirable polymer bases for the composite consist of allyls, aminos, epoxies, phenolics, silicones, and thermoset polyesters. The desired reinforcement fillers for the particular heater are selected and added to the base polymer before transfer (or compression) molding.

To use a solid core 22 for high temperature applications, it is likely necessary to offset the coefficient of thermal expansion ("CTE") for the sheath material from the CTE of the core material. This is due to the fact that core material will naturally be hotter than the sheath material. The CTE for the sheath material must be matched (fall within a specific range) to the temperature of a particular application and the CTE of the core material. The CTE of the materials may be adjusted by controlling the filler levels. For example, higher filler levels in the core material can counter the expansion mismatch. Another example of changing the CTE of the core to overcome mismatching, is the use of reinforcing fillers in the core which have lower CTEs than the reinforcing fillers used in the sheath material.

The improved thermophysical properties of the materials used in the present invention, combined with the ability to use solid cores, allows for the heaters to withstand significantly higher temperatures and heat flux levels than those allowed by the prior art. The prior art, using thermoplastic polymers, could not be heated much beyond 180° F. Prototypes of the present invention heaters have been measured at 400° F. (with a core temp of 470° F.), and it is conceivable that temperatures as high as 750° F. would be possible with the selection of the correct fillers and filler levels. The present invention prototypes have managed heat flux levels of 6 W/in$^2$ in natural convection air, and 30 W/in$^2$ in forced convection fluids.

One thermoset composite that has been found to be suitable for the present invention is sold as AB1000F by Cuyahoga Plastics of Cleveland, Ohio. After molding, the resulting heater can withstand continuous operation of up to 1000° F. without losing physical integrity even though the organic substance burns off by 750° F.

Figure 8:
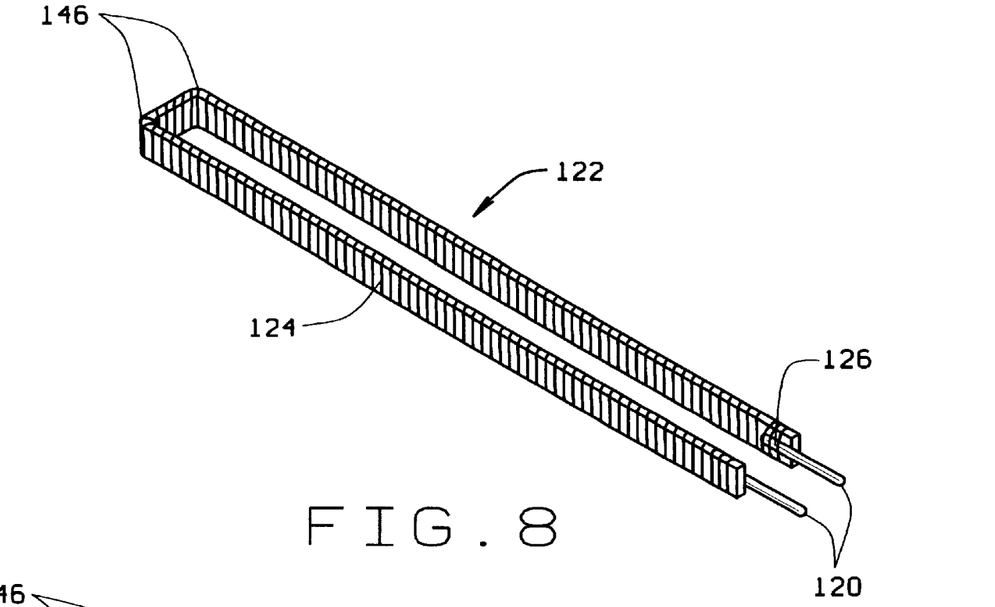
FIG. 8 is an isometric view of a molded polymer composite bent, flat core with a resistance wire disposed therearound and power pins disposed therein.
Figure 9:
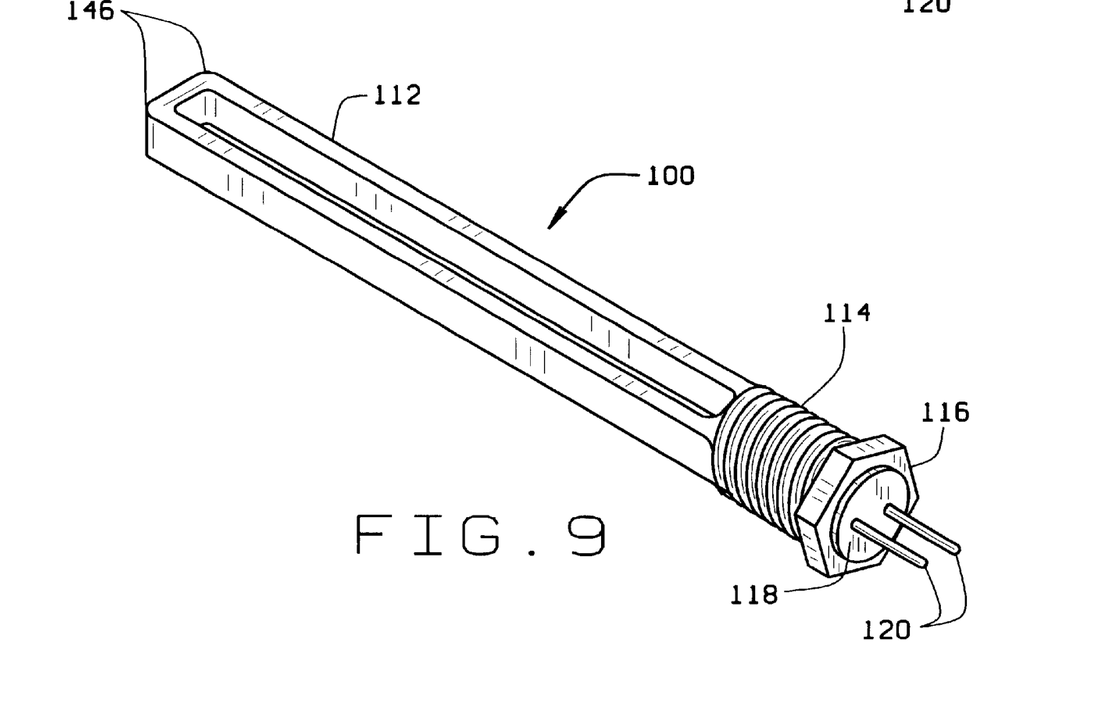
FIG. 9 is an isometric view of a flat-element immersion heater embodiment of the present molded polymer composite heater.

Another benefit of the present invention is the ability to be used in a wide variety of geometric configurations. Differently shaped heaters work better for different applications. For example, flattened heaters provide better convective heat transfer when oriented vertically, than do cylindrical heaters. The preferable geometry will be dependent upon the particulars of an application. However, the present invention allows for that flexibility. For example, FIGS. 8 and 9 show a flattened embodiment 100 of the present invention.

The flattened heater 100 has the same mounting features 114, 116 as the cylindrical heater 10. The sheath 112 is the same material. The core 122, however, is transfer or compression molded in a flattened shape with two closely positioned 90° bends 146, resulting in a hair pin turn. The same type of resistance wire 124 is used, which is coupled to power pins 120 at weld points 126. The power pins 120 then emerge from the finished heater 100 through end 118.

In another embodiment, the resistance wire 124 may be replaced with alternate types of heating elements. For instance thinfilm and thickfilm depositions may be used to form resistive patterns on the core, which are then overmolded with the polymer composite. It is even contemplated that electrically conductive polymers, known in the art, can be used as a core, and then over-molded with a dielectric layer of the polymer composite of the present invention.

In another variation, etched foil circuits, are encapsulated using a single shot molding process. Sheet molding compound (SMC) or preformed bulk molding compound (BMC) may be used in sheet form to sandwich such a circuit. The sandwich should be dimensioned to fit into the compression-molding tool. When the molding machine undergoes its cycle of operation, high pressure and heat are applied to the sandwich, causing the polymer layers to bond and thereby trapping the heating element within the geometry.

To achieve the most accurate and repeatable circuit position the mold should be of positive type. This means that the geometry of the tool does not allow for flash and therefore no lateral flow. It should be easily understood that lateral flow of the polymer material would have strain effects on the encapsulated element.

In the same fashion, patterns of coiled wire can be embedded with a single shot molding process. Since these patterns are quite springy, manufacturing consistency with respect to position is challenging. A reliable solution was found by pushing the pattern into one of the two polymer sandwich layers or into an additional intermediate layer by the use of a press. When using thermoset polymers, the application of pressure should be performed very carefully, as it should not exceed the chemical reaction threshold of the polymer.

The other advantage of the present invention is the ability to mold temperature sensors such as thermocouples directly into the core 22 at any position that is desired. The prior art shows a thermistor located at the very end of the heater (near the mounting position). This is located in a "cold zone." Therefore, the temperature readings obtained are not indicative of the actual temperature of the heater and are further compromised by the generally low thermal conductivity of the polymeric matrix. By placing thermocouples in the core at "hot zones" a true accurate temperature reading may be obtained, which is preferable.

It is important to note that the present invention is not limited to heaters. The same polymer sheaths may be used in conjunction with other components used in thermal systems, such as sensors and control units. Of course, any combination of these components—heaters, sensors, and controls—may also be used inside of these sheaths, as mentioned in the previously.

Figure 10:
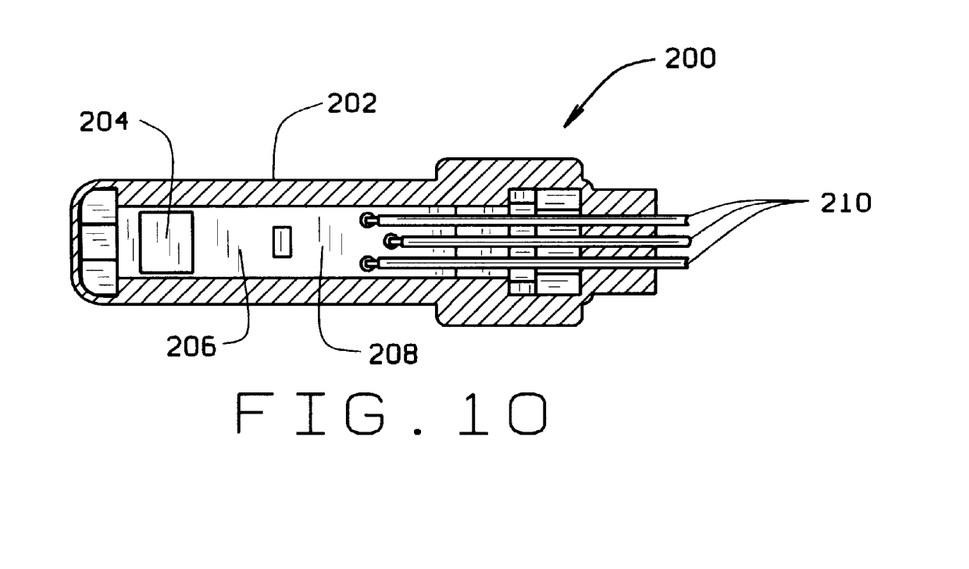
FIG. 10 is a cross-sectional view of a sensor in a polymer composite casing.
Figure 11:
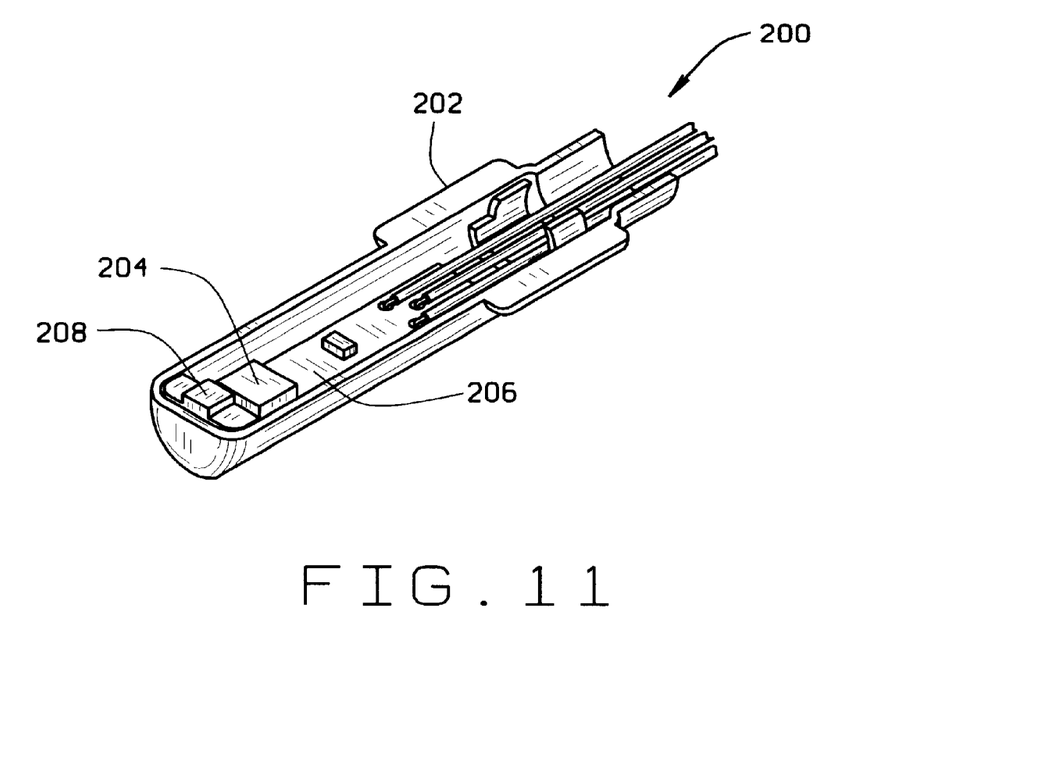
FIG. 11 is an isometric cutaway of the sensor of FIG. 10, showing the polymer casing hollowed for ease of viewing.
Figure 12:
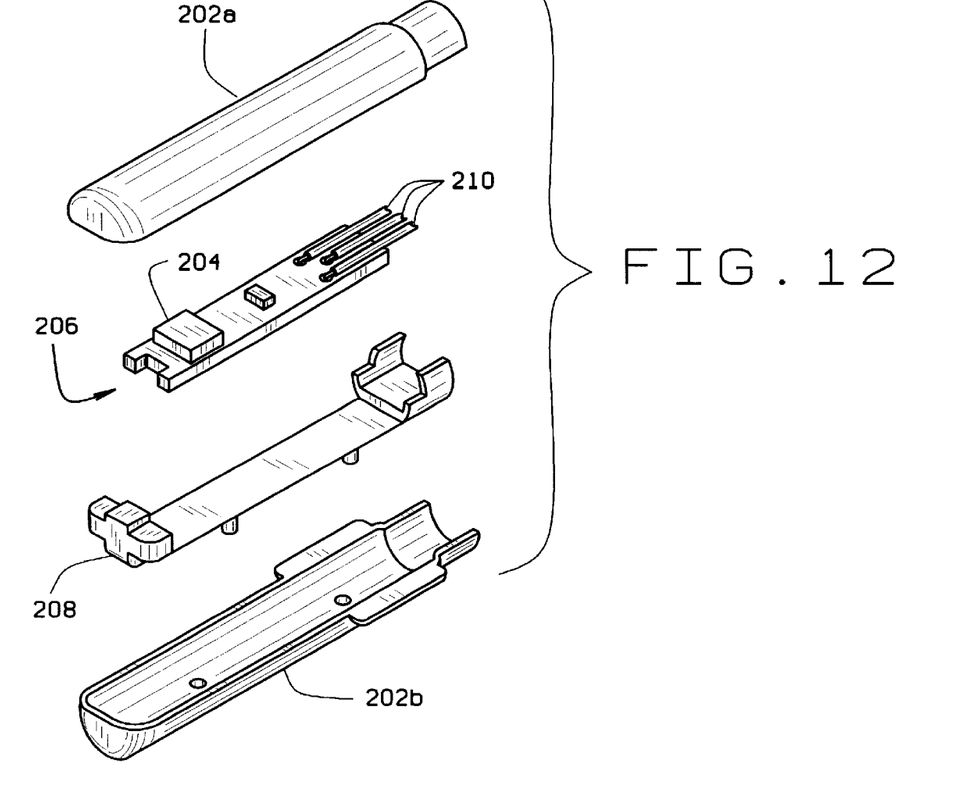
FIG. 12 is an exploded view of the sensor of FIG. 10, again showing the polymer casing hollowed and in pieces for ease of viewing.

For example, FIGS. 10–12 show a sensor 200 molded within the polymer composite sheath 202 of the present invention. The important aspect of the present invention is using the highly thermally conductive polymer sheath, and therefore an endless number of embodiments of sensors could be produced according to the present invention, of which sensor 200 is an exemplary embodiment.

Keeping in mind that sensor 200 is only illustrative of what can be done using the present invention, it comprises an integrated circuit (IC) 204 with temperature sensing capabilities. Such a circuit is manufactured by the Dallas Semiconductor Corporation and can be found in their DS1820 1-Wire™ Digital Thermometer. The IC 204 is mounted on a printed circuit board 206 which is approximately 0.35"×1.75" in size. The entire board 206 is insert molded using a two-step process. First, the board is inserted into a cradle 208 specifically adapted to receive the board 206. The cradle 208 is pre-molded and can be made in any geometric configuration needed depending on the size of the particular component to be insert molded.

After the board 206 is placed in the cradle 208, the pair are then over-molded with the polymer composite described earlier. The over-molding creates the sheath 202. FIG. 12 shows an exploded view of the sensor 200, in which the sheath 200 appears as a top half 202a and a bottom half 202b. The process creates a continuous sheath 202, however. A parting line may be visible between the two halves depending on the shape of the mold used, but the finished product has a single sheath 202 that is not intended to ever be separated. Furthermore, FIGS. 11 and 12 may seem to show a hollow sheath 202 with some interior dead space. The Figures are drawn this way so that the interior components may be easily seen. In actuality, the sheath 202 is completely solid with no dead space between it and any components therein.

One or more leads 210 are left protruding from the sheath 202 during the molding process so that the sensor 200 may receive any power it needs to operate and communicate the physical variable being measured, so that the information may be used. In this particular sensor, the leads 210 represent a ground, a data lead, and a "parasite power" lead. Other types of sensors may be similarly insert molded, such as thermocouples and RTDs.

Figure 13:
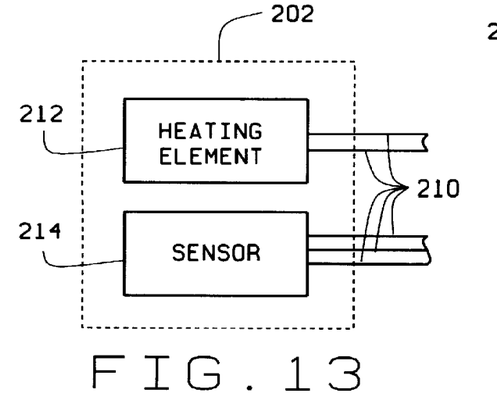
FIG. 13 is a simplified schematic of a heater and sensor integration for use in a polymer composite casing.
Figure 14:
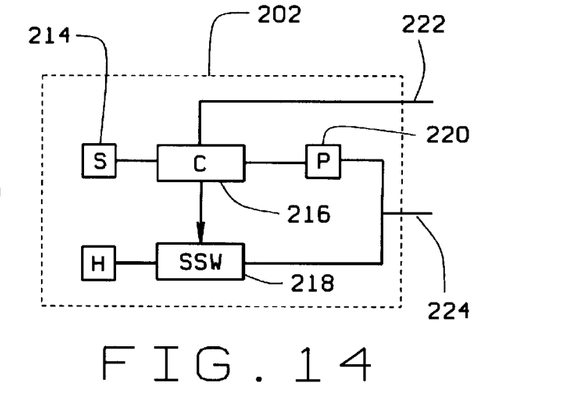
FIG. 14 is a simplified schematic of a completely integrated thermal system for use in a polymer composite casing.

Other possibilities include examples briefly outlined in FIGS. 13 and 14. FIG. 13 shows a combination of the heater 212 and sensor 214, both described above, insert molded into a single sheath 202. A plurality of leads 210 are provided both for the sensor and the heater. FIG. 14 shows a complete thermal system, integrated in a single sheath 202. It comprises a heater 212, sensor 214, control circuit 216, a solid state switch 218, and a power supply 220 for the control circuit 216. Lead (or plurality of leads) 222 provides communication to/from the control circuit 216 so that a ramping function or other control parameters may be entered and the system monitored. A separate set of leads 224 provide power in the form alternating current to the heater 212 and power supply 220.

In operation the control circuit 216 continuously monitors the temperature of the surrounding environment using the sensor 214. Based on programmed information that could be hardwired or could come via leads 222, the control circuit 216 opens or closes solid state switch 218 which, in turn, deenergizes or energizes the coils of heater 212. The control circuit 216 may be powered by a power supply 220, which in this instance is a simple full wave bridge rectifier.

Another important use for the present invention is as a thermoelectric module. Using the Peltier Effect, two different type wires of a known combination can be welded together and the resulting junction embedded in the polymer sheath. When a small current is applied through the junction, thermal energy is absorbed and the high thermal conductivity of the polymer composite sheath of the present invention aids in the rate at which this occurs.

Sensors that measure physical properties other than temperature can also be used as a part of the present invention. For instance, pressure transducers or strain gauges can be insert-molded into the polymer sheath with or without heaters. It is also contemplated to use a calcification sediment check sensor for use in hard water heating systems.

While the foregoing is directed to the preferred embodiments of the present invention, other and further embodiments of the invention may be devised without departing from the basic scope thereof, and the scope thereof is determined by the claims which follow.

What is claimed is:

1. An integrated sensor unit comprising:
    a sheath comprising a transfer moldable polymer composite;
    an electrical sensor encased within said sheath:
    one or more leads operatively coupled to said sensor and extending therefrom to a point outside said sheath; and
    wherein said sensor is capable of measuring a physical variable and providing an electrical signal through said leads indicative of the variable;
    wherein said transfer moldable polymer composite is a first transfer moldable polymer composite and further comprising:
    a core comprising a second transfer moldable polymer composite; and an electrically conductive heating element disposed about said core, said heating element having two ends adapted to receive an electric current.

2. The integrated sensor unit of claim 1, wherein said electrical sensor is located inside said core.

3. The integrated sensor unit of claim 1, wherein said electrical sensor is located outside said core.

4. The integrated sensor unit of claim 1, wherein said core is solid.

5. An integrated heating system comprising:
    a core comprising a first transfer moldable polymer composite;
    an electrically conductive heating element disposed about said core, said heating element having two ends adapted to receive an electric current;
    a sheath surrounding said heating element, said sheath comprising a second transfer moldable polymer composite;
    an electrical sensor disposed within said sheath, wherein said sensor is capable of measuring a physical variable and providing an electrical signal through one or more leads indicative of the variable; and
    control means disposed within said sheath, said control means adapted to receive the electrical signal from said sensor and accordingly regulating an electric current to the ends of said heating element.

6. The integrated heating system of claim 5, wherein the variable measured by said electrical sensor is temperature.

7. The integrated heating system of claim 6, further comprising a plurality of leads extending from said sheath to a point outside thereof, said leads adapted to receive power for said heating element and said control means.

8. The integrated heating system of claim 7, wherein said leads are adapted to receive power from a single source and distribute the power to said heating element and said control means respectively.

9. The integrated heating system of claim 8, wherein the power source supplies an electrical current in alternating directions, and further comprising a rectifier operatively coupled to said control means, said rectifier converting the alternating electrical current to a direct electrical current.

10. The integrated heating system of claim 7, further comprising a solid state switch in the path of the power to said heating element and operatively coupled to said control means.

11. The integrated heating system of claim 10, wherein said control means closes said switch when the electrical signal from said electrical sensor indicates a temperature below a certain threshold temperature, and opens said switch when the electrical signal from said electrical sensor indicates a temperature above the threshold temperature.

12. The integrated heating system of claim 11, further comprising programming means operatively coupled to said control means for altering the threshold temperature of said control means.

13. The integrated heating system of claim 7, further comprising an electromechanical switch in the path of the power to said heating element and operatively coupled to said control means.

14. The integrated sensor unit of claim 6, wherein said transfer moldable polymer is a thermoset polymer.

15. The integrated sensor unit of claim 14, wherein said transfer moldable polymer is selected from the group consisting of allyls, aminos, epoxies, phenolics, silicones, and thermoset polyesters.

16. The integrated sensor unit of claim 6, further comprising an additive within said transfer moldable polymer in an amount greater than 50% by weight.

17. The integrated sensor unit of claim 6, wherein said additive is thermally conductive.

* * * * *